(12) United States Patent
Wei et al.

(10) Patent No.: US 8,179,668 B2
(45) Date of Patent: May 15, 2012

(54) HANDHELD ELECTRONIC DEVICE

(75) Inventors: Chih-Sheng Wei, Taoyuan County (TW); Tsung-Hwa Yang, Taoyuan County (TW); Yi-Shen Wang, Taoyuan County (TW); Yien-Chun Kuo, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 234 days.

(21) Appl. No.: 12/778,125

(22) Filed: May 12, 2010

(65) Prior Publication Data

US 2011/0134595 A1 Jun. 9, 2011

(30) Foreign Application Priority Data

Dec. 8, 2009 (TW) .............................. 98141941 A (51) Int. Cl.
*H05K 5/00* (2006.01)
*H05K 7/00* (2006.01)
*H04M 1/00* (2006.01)

(52) U.S. Cl. ......... 361/679.09; 361/679.01; 361/679.02; 361/679.26; 361/679.27; 361/679.28; 361/679.3; 455/575.3; 455/575.4

(58) Field of Classification Search ............. 361/679.01, 361/679.02, 679.08, 679.09, 679.21–679.3, 361/679.55–679.59; 455/575.1, 575.3, 575.4, 455/575.8, 325, 556.1, 550.1, 90.1; 345/156, 345/157, 168, 169, 184
See application file for complete search history.

(56) References Cited

U.S. PATENT DOCUMENTS

| | | |
|---|---|---|
| 2006/0252471 A1 | 11/2006 | Pan |
| 2007/0105606 A1 | 5/2007 | Yoon et al. |
| 2008/0052874 A1 | 3/2008 | Liu |
| 2008/0174942 A1* | 7/2008 | Yang et al. ..................... 361/680 |
| 2009/0009949 A1 | 1/2009 | Lai et al. |
| 2009/0137293 A1 | 5/2009 | Yoo et al. |
| 2009/0286573 A1* | 11/2009 | Jang et al. ..................... 455/566 |

FOREIGN PATENT DOCUMENTS

| | | |
|---|---|---|
| EP | 2151976 | 2/2010 |
| TW | 200832112 | 8/2008 |

OTHER PUBLICATIONS

"1st Office Action of Europe Counterpart Application", issued on Jan. 18, 2011, p. 1-p. 6, in which the listed references were cited.
"Extended Search Report of Europe Counterpart Application", issued on Jul. 29, 2010, p. 1-p. 3, in which the listed references were cited.
"Office Action of Taiwan Counterpart Application", issued on Jan. 10, 2012, p. 1-p. 9, in which the listed references were cited.

\* cited by examiner

*Primary Examiner* — Jayprakash N Gandhi
*Assistant Examiner* — Jerry Wu
(74) *Attorney, Agent, or Firm* — Jianq Chyun IP Office (57) ABSTRACT

A handheld electronic device including a lower body, an upper body, a sliding mechanism and a pivot axle is provided. The lower body has a carrying surface and a recess on the carrying surface. The upper body is disposed on the carrying surface. The sliding mechanism is disposed between the upper body and the lower body for driving the upper body sliding relative to the lower body. The pivot axle is disposed between the sliding mechanism and the lower body. When the handheld electronic device is transformed from a retracting state to a spreading state, an end of the upper body enters the recess, and the carrying surface of the lower body and a top surface of the upper body form an included angle.

16 Claims, 7 Drawing Sheets

HANDHELD ELECTRONIC DEVICE

CROSS-REFERENCE TO RELATED APPLICATION

This application claims the priority benefit of Taiwan application serial no. 98141941, filed on Dec. 8, 2009. The entirety of the above-mentioned patent application is hereby incorporated by reference herein and made a part of specification.

BACKGROUND OF THE INVENTION

1. Field of the Invention

The present invention relates to a handheld electronic device and more particularly, to a sliding type handheld electronic device.

2. Description of Related Art

With advancement of information technology at present, it becomes easier and easier to obtain necessary information from daily-used electronic devices. On the other hand, relying on the dramatic improvement of the state of the art, handheld electronic devices are developed to be lighter and slimmer. Being advantaged in portability, handheld electronic devices are popular and broadly used in our daily life.

Various types of cell phones such as bar type, folding type, rotating type, and sliding type, etc. are proposed to meet different preferences and requirements. In respect to a sliding type handheld electronic device, two bodies are slidely coupled together to be operated in an expanding mode and a retracting mode. Stacking the two bodies facilitates minimizing dimensions of the slide type handheld electronic device, while the two bodies are expanded in specific operating mode.

However, the conventional sliding type handheld electronic device forms a step height difference between the two bodies in the spreading state, which affects the unity of profile and decrease smoothness and speed in operating between the two bodies.

Furthermore, some handheld electronic devices are provided with keyboards on their upper bodies and display screens on their lower bodies. The keyboards on the lower bodies are exposed by sliding the upper bodies to a side of the lower bodies, such that users can input information into the handheld electronic devices via the keyboards. However, as to the convention design, an upper body having a display screen and a lower body having a keyboard are kept in parallel after being spread. Hence, the viewing angle of a user is not adapted to the gesture in operating the handheld electronic device, and it is hard to watch the display screen in a comfortable manner while take the convenience of inputting information as well.

SUMMARY OF THE INVENTION

The present application provides a handheld electronic device, wherein an upper body and a lower body has an included angle when the handheld electronic device is in a spreading state, so as to improve the comfort and convenience in using the handheld electronic device.

As embodied and broadly described herein, a handheld electronic device including a lower body, an upper body, a sliding mechanism and a pivot axle is provided. The lower body has a carrying surface and a recess on the carrying surface. The upper body is disposed on the carrying surface and has a first end and a second end opposite to the first end. The sliding mechanism is disposed between the upper body and the lower body, and the sliding mechanism comprises a first sliding member and a second sliding member, which are configured to slide relative to each other, and the first sliding member is connected to the upper body. The pivot axle is disposed at a first side of the carrying surface and located between the recess and the first side, and the pivot axle is connected to the second sliding member and the lower body. When the handheld electronic device is transformed from a retracting state to a spreading state, the first end of the upper body slides from a position immediately on the lower body to a position outside the first side of the carrying surface, and then when the upper body reaches a predetermined position, the upper body rotates along the pivot axle relative to the lower body, and the second end of the upper body enters the recess. Thereby, the carrying surface of the lower surface and a top surface of the upper body form an included angle, which is larger or equal to 90 degree and smaller than 180 degree.

As to the above, the present application configures a upper body and a lower body being spread relative to each other and forming an included angle by adopting a simple design of a sliding mechanism and a pivot axle, while a portion of the upper body adjacent to the lower body may further enters a recess of the lower body after rotating the upper body relative to the lower to form a step-free continuous surface. Therefore, not only the comfort and the convenience in using the handheld electronic device can be increased, but also the unity of profile of the handheld electronic device can be improved. Furthermore, the smoothness and feel in operating between the upper body and the lower body can be enhanced.

In order to make the aforementioned and other features and advantages of the application more comprehensible, embodiments accompanying figures are described in detail below.

BRIEF DESCRIPTION OF THE DRAWINGS

The accompanying drawings are included to provide a further understanding of the application and are incorporated in and constitute a part of this specification. The drawings illustrate embodiments of the application and, together with the description, serve to explain the principles of the application.

DESCRIPTION OF EMBODIMENTS

Figure 1A:
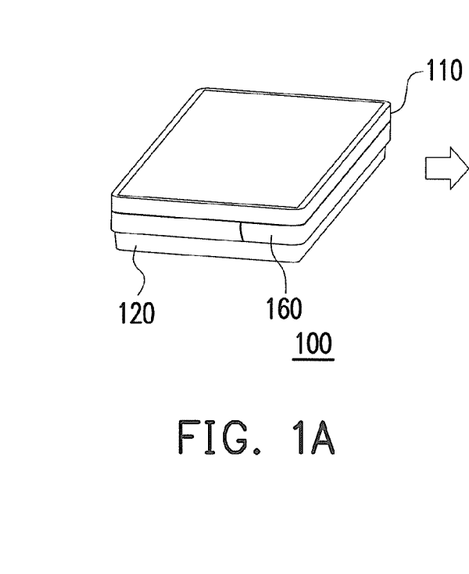
FIGS. 1A through 1C illustrate an operation process of a handheld electronic device according to an embodiment of the present invention.
Figure 1B:
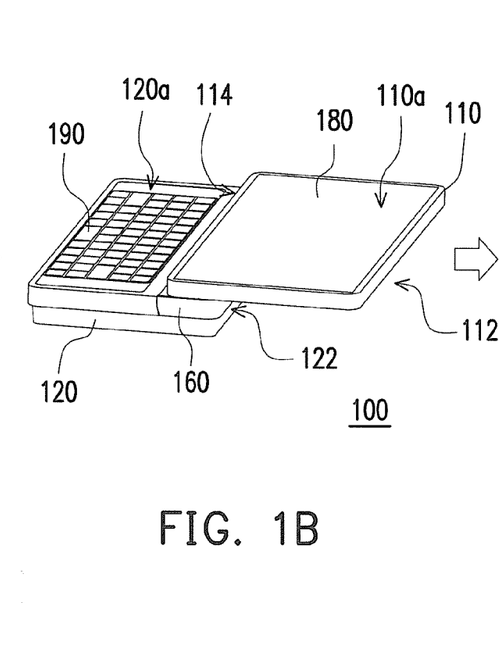
Figure 1C:
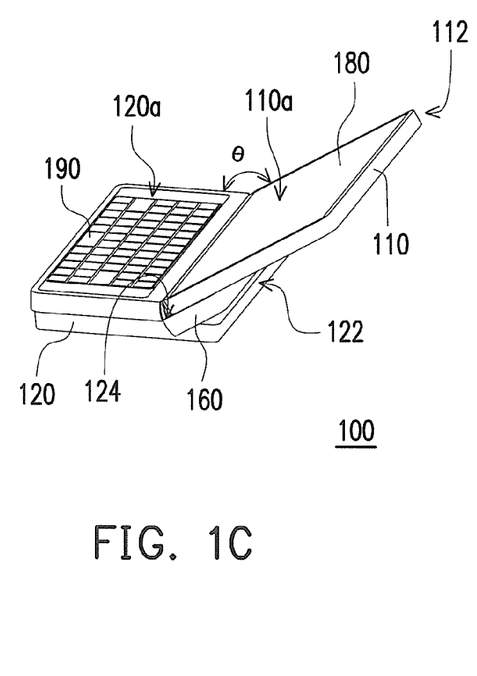

FIGS. 1A through 1C illustrate an operation process of a handheld electronic device according to an embodiment of the present invention.

Referring to FIG. 1A, the handheld electronic device 100 of the present embodiment is in a retracting state, wherein the upper body 110 and the lower body 120 are stacked with each other, and the upper body 110 is located immediately on a carrying surface 120a of the lower body 120. In general, the upper body 110 is provided with a display screen 180 for displaying image or text information, the lower body 120 is provided with a keyboard 190 for a user to input information, while the present embodiment is not limited thereto. Along with the continuous development of the functions of the handheld electronic device 100, the display screen may be a touch screen by which a user can input information in a touch manner, and therefore the user may perform an operation between the upper body 110 and the lower body 120 back and forth when using the handheld electronic device 100. In other embodiments, both of the upper body 110 and the lower body 120 may be provided with their display screens to accomplish a dual-screen display or operation in a touch manner.

Then, referring to FIG. 1B, the upper body 110 slides relative to the lower body 120, such that a first end 112 of the upper body 110 slides from a position immediately on the lower body 120 to a position outside a first side 122 of the carrying surface 120a, and then when the upper body 110 reaches a predetermined position. At this time, the upper body 110 exposes the keyboard 190 or other devices on the carrying surface 120a of the lower body 120.

Next, referring to FIG. 1C, after reaching the predetermined position, the upper body 110 rotates relative to the lower body 120, and a second end 114 of the upper body 110 enters a recess 124 on the carrying surface 120a of the lower body 120. Thereby, the handheld electronic device 100 becomes a spreading state, and an included angle θ is formed between the carrying surface 120a of the lower body 120 and a top surface 110a of the upper body 110, wherein the included angle θ is larger or equal to 90 degree and smaller than 180 degree.

Figure 2:
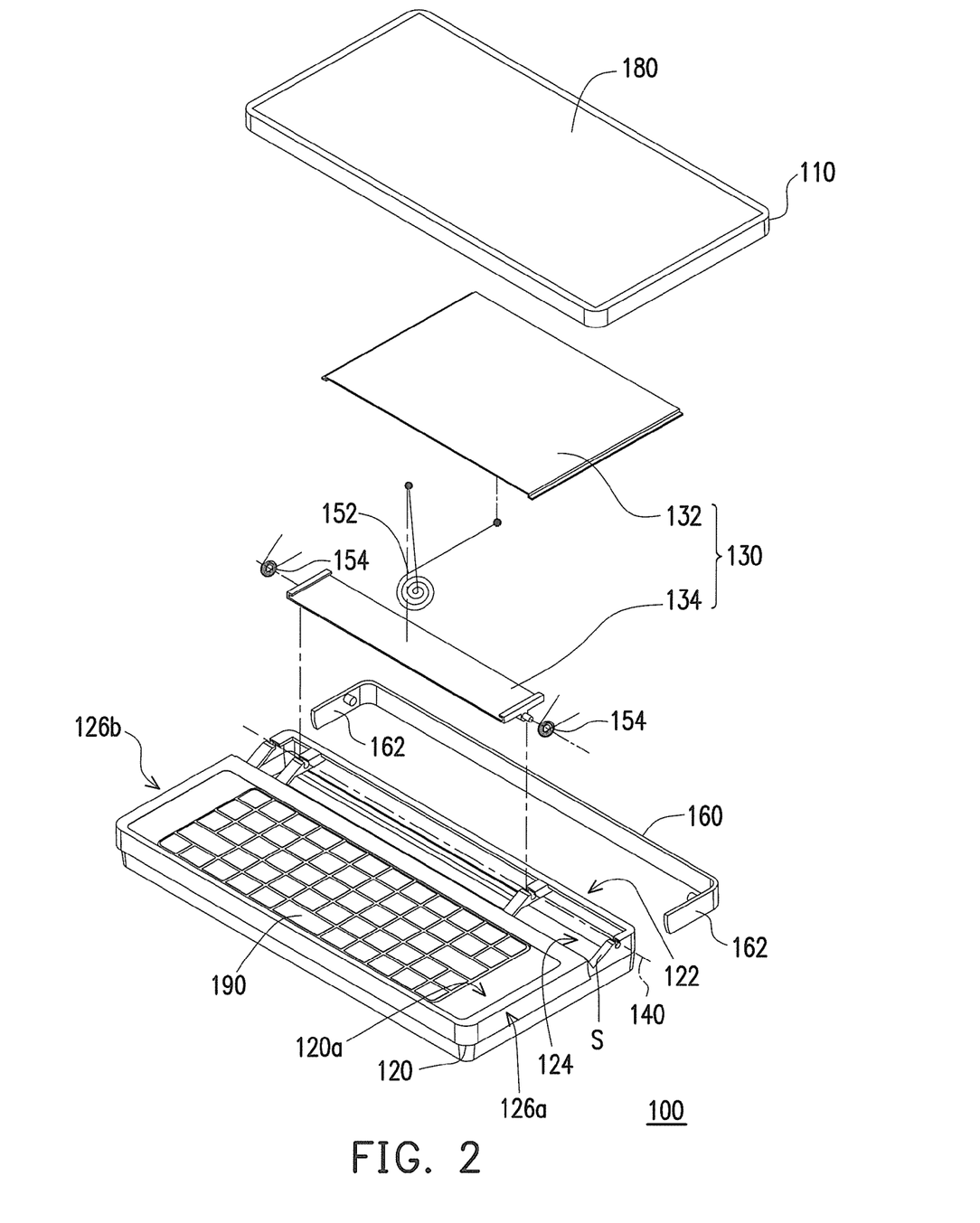
FIG. 2 is an explosive view of the handheld electronic device of FIGS. 1A through 1C.

FIG. 2 is an explosive view of the handheld electronic device of FIGS. 1A through 1C. Referring to FIG. 2, accompanying with the requirement of forming the recess 124 on the lower body 120, the structural design of the lower body 120 is considered in the embodiment. For example, an inclined plane S is formed on the shell of the lower body 120, such that the upper body 110 can lean against the inclined plane S after rotating relative to the lower body 120, to restrict the degree of rotation of the upper body 110.

A sliding mechanism 130 is disposed between the upper body 110 and the lower body 120 for driving the upper body 110 sliding relative to the lower body 120. The sliding mechanism 130 of the present embodiment includes a first sliding member 132 and a second sliding member 134, which are configured to slide relative to each other, and the first sliding member 132 is connected to the upper body 110. In addition, to accomplish the rotation of the upper body 110 relative to the lower body 120 after the upper body 110 reaches the predetermined position, a pivot axle 140 is disposed between the lower body 120 and the sliding mechanism 130. The pivot axle 140 is connected between the second sliding member 134 of the sliding mechanism 130 and the lower body 120, and therefore the sliding mechanism 130 along with the upper body 110 can rotate relative to the lower body 120 via the pivot axle 140.

Specifically, the pivot axle 140 is disposed between the recess 124 and the first side 122, while the axial direction of the pivot axle 140 extends along the first side 122 of the carrying surface 120a. Herein, the pivot axle 140 can refer to any rotating mechanism for providing pivot function, for example, a bearing and a seat disposed between the second sliding member 134 and the lower body 120, or other equivalent members.

Figure 3A:
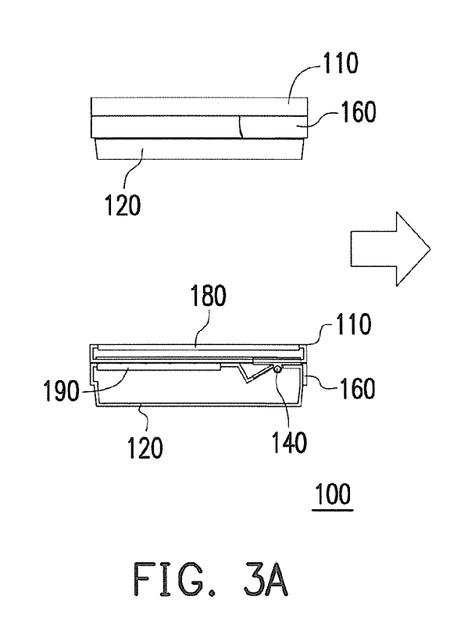
FIGS. 3A through 3C respectively show both of a side view and a cross-sectional view of the handheld electronic device from a retracting state to a spreading state as illustrated in FIGS. 1A through 1C.
Figure 3B:
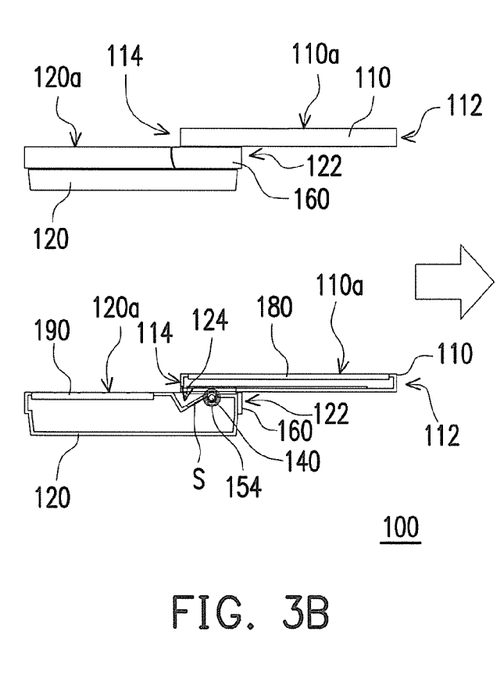
Figure 3C:
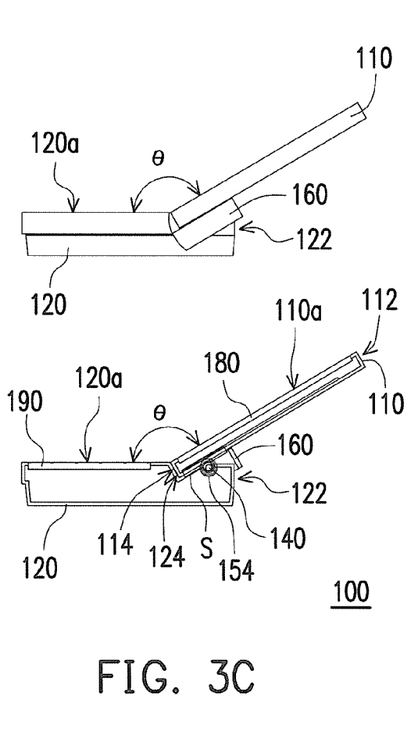

FIGS. 3A through 3C respectively show both of a side view and a cross-sectional view of the handheld electronic device 100 from the retracting state to the spreading state as illustrated in FIGS. 1A through 1C. Referring to FIGS. 1A through 1C, 2, and 3A through 3C, when the handheld electronic device 100 is transformed from the retracting state as shown in FIGS. 1A and 3A to the spreading state as shown in FIGS. 1C and 3C, the first end 112 of the upper body 110 slides from the position immediately on the lower body 120 to the position outside the first side 122 of the carrying surface 120a by the sliding mechanism. In addition, after reaching the predetermined position, the upper body 110 rotates relative to the lower body 120 by the pivot axle 140, and the second end 114 of the upper body 110 enters the recess 124 on the carrying surface 120a of the lower body 120 so as to form the included angle θ and leans against the inclined plane S.

In the present embodiment, when the handheld electronic device 100 n the spreading state, the second end 114 of the upper body 110 enters the recess 124 on the carrying surface 120a of the lower body 120, and therefore the unity of profile of the handheld electronic device 100 can be improved. In addition, since the upper body 110 and the lower body 120 forms the included angle θ in the spreading state, the viewing angle of the user in watching the display screen 180 of the upper body 110 is adapted to the gesture in operating the keyboard 190 of the lower body 120. Therefore, it is comfortable to watch the image or text information on the display screen and inputting information via the keyboard 190 as well.

Furthermore, in the present embodiment, the carrying surface 120a of the lower body 120 and the top surface 110a of the upper body 110 together form a step-free continuous surface. Said step-free design is suitable for operating back and forth between the upper body 110 and the lower body 120. For example, when the display screen 180 of the upper body 110 is a touch screen, the user can input information in the touch manner and perform operations back and forth between the display screen 180 of the upper body 110 and the keyboard 190 of the lower body 120. The said step-free design eliminates the height difference between the upper body 110 and the lower body 120 in operating the handheld electronic device 100, and thus the smoothness and feel in operating the handheld electronic device 100 are enhanced.

In another embodiment, the upper body 110 and the lower body 120 may have smooth profiles, and therefore a gap or a height difference exists between the upper body 110 and the lower body 120 in the spreading state. However, the second end 114 of the upper body 100 still enters the recess 124.

In further another embodiment, the upper body 110 and the lower body 120 are both provided with their display screens, wherein the carrying surface 120a of the lower body 120 and the top surface 110a of the upper body 110 together form a step-free continuous surface, so as to accomplish a seamless display of dual screen or a touch operation on the two display screens.

Referring to FIG. 2, a first elastic member 152 is disposed between the first sliding member 132 and the second sliding member 134 to provide an elastic force driving the first sliding member 132 sliding relative to the second sliding member 134. Specifically, the first elastic member 152 can be a semi-auto spring, such as a coil spring, a helical spring or other elastic member capable of driving the first sliding member 132 and the second sliding member 134 to accomplish the semi-auto sliding, so as to provide the elastic force required in the process of retracting or spreading the upper body 110 and the lower body 120. In other words, the active device array substrate 100 is capable of performing a semi-auto sliding operation. When the upper body 110 is on the retracting position as shown in FIGS. 1A and 3A, the user only needs to push the upper body 110 from the retracting position to the right side in the figures for a little stroke, and then the upper body 110 can automatically slide to the predetermined position as shown in FIGS. 1B and 3B.

Moreover, referring to FIG. 2, a second elastic member 154 is provided between the second sliding member 134 and the lower body 120 to provide an elastic force driving the upper body 110 rotating relative to the lower body 120. In the present embodiment, the second elastic member 154 may be a torsion spring disposed on the pivot axle 140 and connected the second sliding member 134 and the lower body 120. However, the pivot axle 140 can further be a torsion axle itself. Whereby, the second elastic member 154 is no more required, and the pivot axle 140 can apply a torque on the second sliding member 134. Furthermore, even if the handheld electronic device 100 is not provided with the second sliding member 154 or the pivot axle 140 is not a torsion axle, the upper body 110 can still be raised manually to form the spreading state.

No matter the handheld electronic device 100 is in the retracting state or the spreading state or in the transforming process between the two state, the second elastic member 154 applies a unidirectional torque on the second sliding member 134, such that the second sliding member 134 drives the whole sliding mechanism 130 and the upper body to rotate relative to the lower body 120 by the unidirectional torque and forms the spreading state in FIGS. 1C and 3C.

Reversely, as the handheld electronic device 100 is transformed from the spreading state to the retracting state, the upper body 110 is pressed toward the lower body 120, i.e. applying a force on the first end 112 of the upper body 110 to counteract the torque of the second elastic member 154, to drive the upper body back to the predetermined position as shown in FIGS. 1B and 3B.

Then, the user only needs to push the upper body 110 from the predetermined position to the left side in the figures for a little stroke, and then the upper body 110 can be automatically drawn back to the retracting position as shown in FIGS. 1A and 3A by the elastic force of the first elastic member 152.

In another embodiment, the second elastic member 154 can further be a helical spring disposed between the second sliding member 134 and the lower body 120, or the second elastic member 154 can be other equivalent members to provide the unidirectional torque on the whole sliding mechanism 130 and the upper body 110.

In addition, considering that the recess 124 of the lower body 120 may be exposed as retracting or spreading the handheld electronic device 100 and affect the appearance of the handheld electronic device 100, a shielding member for shielding the recess 124 can be provided on the position corresponding to the recess 124.

Specifically, with respect to the handheld electronic device 100 of FIG. 2, the inclined plane S is formed on the shell of the lower body 120, and the recess 124 is exposed at two opposite sides 126a and 126b adjacent to the first side 122. Accordingly, a U-shaped ring 160 is disposed at the first side 122 of the carrying surface 120a, and two arms 162 of the U-shaped ring 160 extends to the two opposite sides 126a and 126b to cover the recess 124.

In this embodiment, the U-shaped ring 160 leans against the upper body 110 and the two arms 162 of the U-shaped ring 160 is connected to the pivot axle 140. Therefore, when the upper body 110 rotates relative to the lower body 120, the U-shaped ring 160 is driven to rotate relative to the lower body 120 at the same time, and the two arms 162 of the U-shaped ring 160 can shield the recess 124 exposed at the two opposite sides of the lower body 120 in the process of retracting or spreading the handheld electronic device 100.

Figure 4:
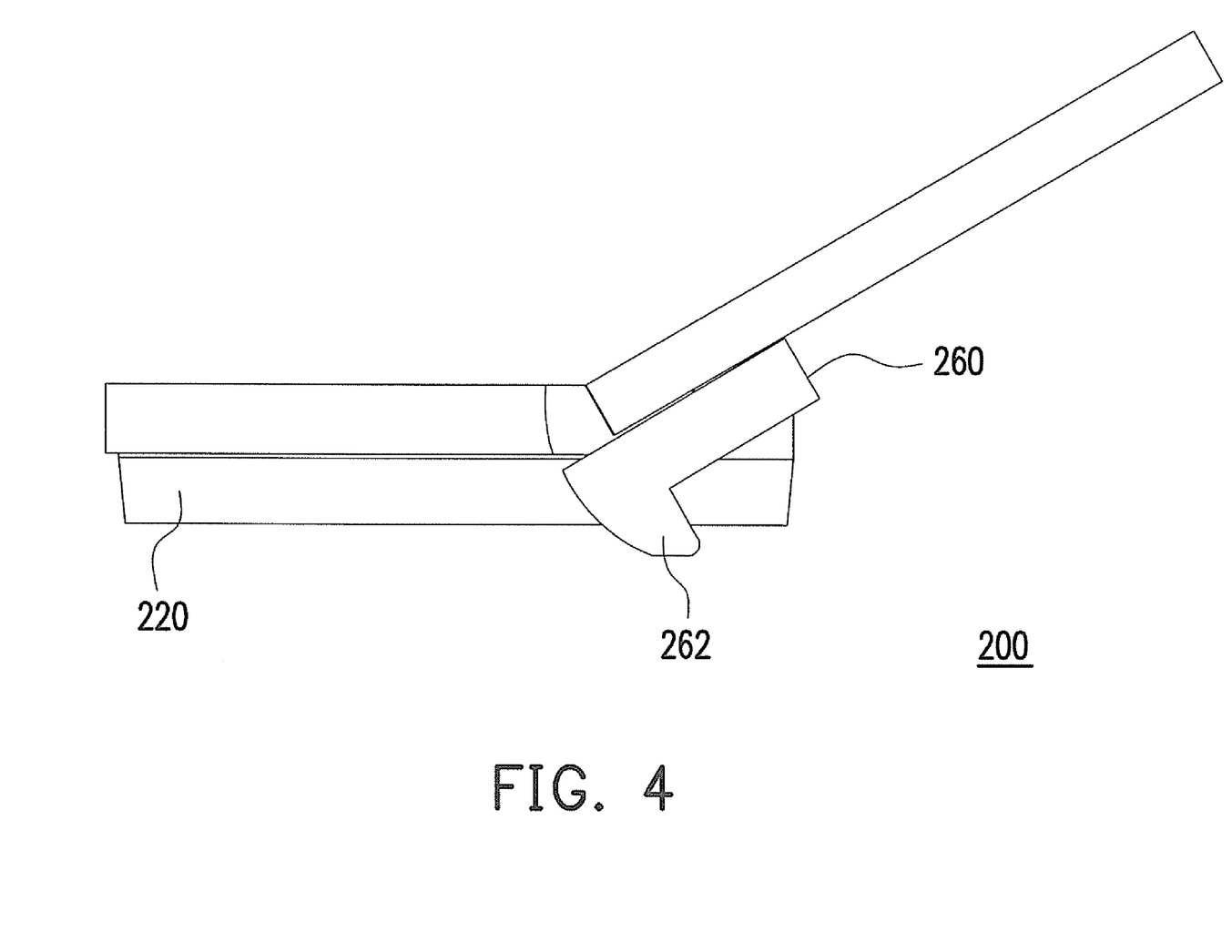
FIG. 4 is a side view showing a handheld electronic device according to another embodiment of the present invention.

FIG. 4 is a side view showing a handheld electronic device in the spreading state according to another embodiment of the present invention. The main difference between the present embodiment and the previous embodiment is that the profile of the U-shaped ring 260 of the present embodiment should be amended, such that the two arms 262 of the U-shaped ring 260 rotate and protrude outside a bottom surface of the lower body 220 as the handheld electronic device 100 is becoming the spreading state, for being as standing legs. The inclined angle of the handheld electronic device 200 standing on a plane can be controlled by adjusting the length of the standing legs.

Figures 5A, 5B, 5C:
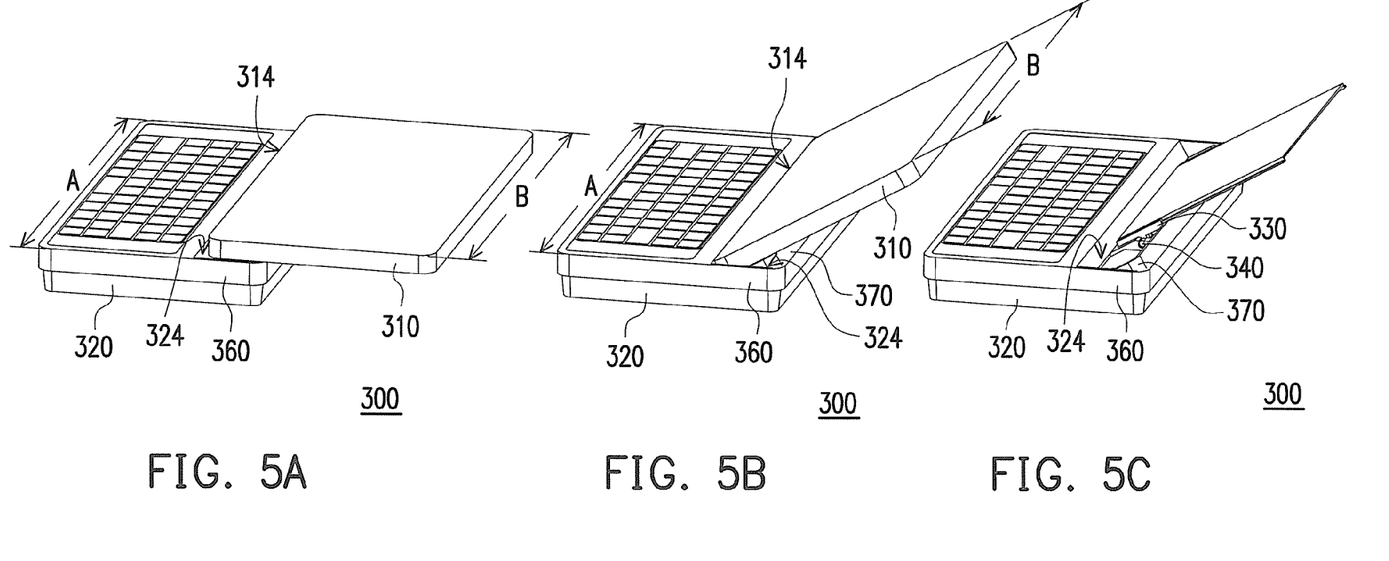
FIGS. 5A through 5C show a handheld electronic device transforming from a retracting state to the spreading state according to further another embodiment of the present invention.

FIGS. 5A through 5C show a handheld electronic device transforming from a retracting state to the spreading state according to further another embodiment of the present invention. The difference between this embodiment and the previous embodiment is that the U-shaped ring 360 and the lower body 320 of the present embodiment are formed integrally. In other words, the U-shaped ring 360 is fabricated with the shell of the lower body 320 and fixed on the lower body 320. Thereby, the recess 324 is hided in the U-shaped ring 360 without being exposed. Furthermore, to permit the second end 314 of the upper body 310 entering the recess 324 of the lower body 320 in the spreading state, dimensions of the relative members should be considered, wherein the width A of the U-shaped ring 360 is greater than the width B of the upper body 310, such that after the upper body 310 rotates relative to the lower body 320, a second end 314 of the upper body 310 can enter the recess 324 of the lower body 320.

FIG. 5C omits the upper body 310 of the handheld electronic device 300 for clearly illustrating the sliding mechanism 330 and the pivot axle 340. Referring to FIGS. 5B and 5C, since the U-shaped ring 360 is integrally formed with the shell of the lower body 320, further another movable U-shaped ring 370 can be provided and disposed in the recess 324 surrounded by the U-shaped ring 360. The configuration and operation of the U-shaped ring 370 are similar to the U-shaped ring 160 of the previous embodiment. Therefore, when the handheld electronic device 300 is transformed into the spreading state, the U-shaped ring 370 can shield the recess 324 and the sliding mechanism 330 and the pivot axle 340 in the recess 324, which are exposed during the rotation of the upper body 310.

Figure 6A:
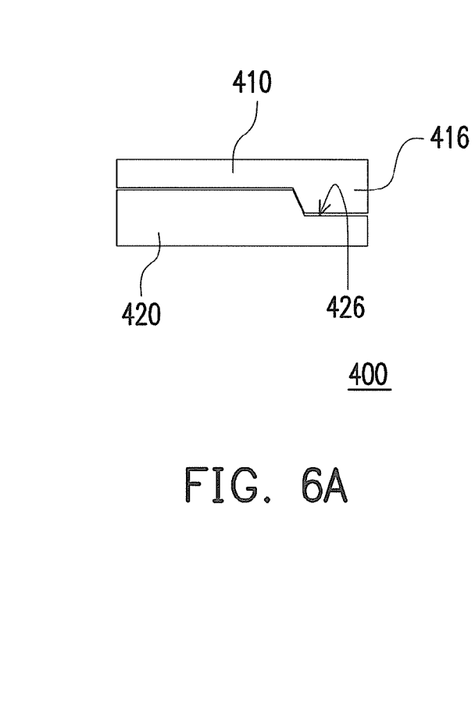
FIGS. 6A through 6C are respectively cross-sectional views showing a handheld electronic device transforming from a retracting state to the spreading state according to further another embodiment of the present invention.
Figure 6B:
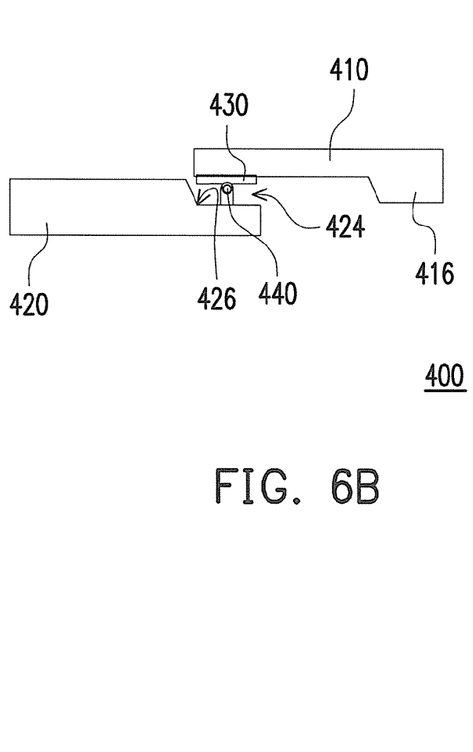
Figure 6C:
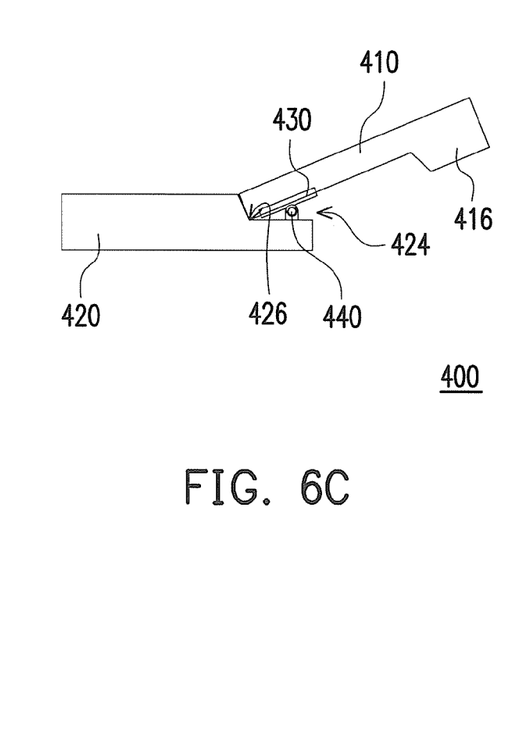

FIGS. 6A through 6C are respectively cross-sectional views showing a handheld electronic device transforming from a retracting state to the spreading state according to further another embodiment of the present invention. The main difference between the present embodiment and the previous embodiment is that the present embodiment omits the U-shaped ring and instead modifying the profile of the upper body 410 and the lower body 420 of the handheld electronic device 400, wherein an end of the lower body 420 corresponding to the recess 424 is shrunk in its thickness to form a step portion 426 exposing the recess 424, the sliding mechanism 230 and the pivot axle 440. The upper body 410 has a bump portion 416 corresponding to and having a profile complying with the step portion 426, such that the bump portion 416 and the step portion 426 closely meet and cover the recess 424 when the handheld electronic device is in the retracting state.

Figure 7A:
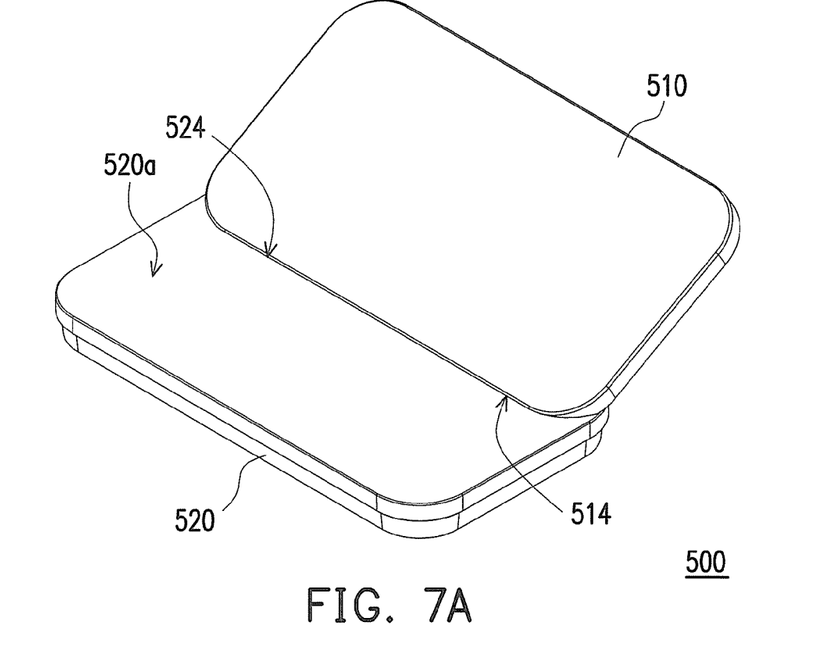
FIG. 7A is a diagram showing a handheld electronic device in a spreading state according to another embodiment of the present invention.
Figure 7B:
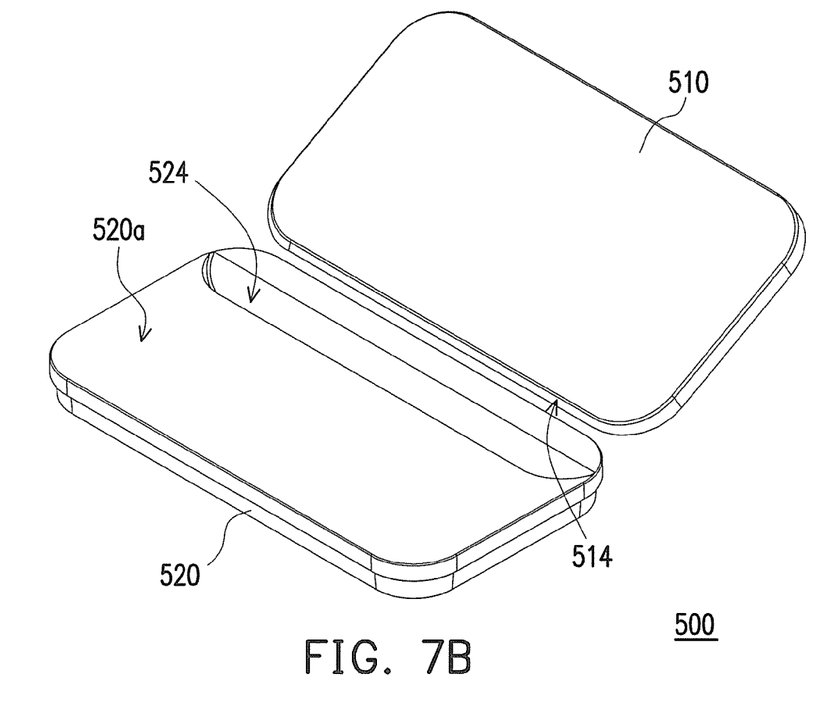
FIG. 7B is an assembly view of the upper body and the lower body of the handheld electronic device of FIG. 7A.

FIG. 7A is a diagram showing a handheld electronic device in a spreading state according to another embodiment of the present invention. FIG. 7B is an assembly view of the upper body and the lower body of the handheld electronic device of FIG. 7A. Referring to FIGS. 7A and 7B, the recess 524 formed on the carrying surface 520a of the lower body 520 has a profile complying with the second end 514 of the upper body 510, and the recess 524 is formed integrally with the lower body 520. By which, the unity of profile of the handheld electronic device 500 in the spreading state can be improved, and the region of the carrying surface 520a adjacent to the recess 524 is maintained planar. Therefore, not only the drawback caused by the height difference between the upper body 510 and the lower body 520 in operating the handheld electronic device 500 can be eliminated to enhance the smoothness and feel in operating the handheld electronic device 500, but also the seamless display of dual screen or the touch operation on the two display screens can be accomplished.

Furthermore, to permit the second end 514 of the upper body 510 entering the recess 524 of the lower body 520 in the spreading state, the recess 524 of the present embodiment extends to two opposite sides of the carrying surface 520a, and two corners of the second end 514 of the upper body 510 are rounded, such that the second end 514 of the upper body 510 can enter the recess 524 of the lower body 520 after the upper body 510 rotates relative to the lower body 520. More specifically, the recess 524 can be covered by the second end 514 of the upper body 510 and hidden under the upper body 510.

In summary, the handheld electronic device accomplishes the relative motion between the upper body and the lower body by adopting a sliding mechanism and a pivot axle to form an included angle after spreading the upper body relative to the lower body, and a portion of the upper body adjacent to the lower body enters a recess of the lower body after rotating the upper body relative to the lower to form a step-free continuous surface. Therefore, the unity of profile of the handheld electronic device can be improved. The comfort and the convenience in using the handheld electronic device can be increased, and the smoothness and feel in operating between the upper body and the lower body can be enhanced. In addition, the appearance and the feel of operation of the handheld electronic device can further be improved by disposing a U-shaped ring on the lower body for shielding the recess, modifying the profile or dimensions of the upper body and the lower body, or varying the fabricating manner or the profile of the recess. Furthermore, a seamless display of dual screen or a touch operation on two display screens can also be accomplished in the present application.

Although the application has been described with reference to the above embodiments, it will be apparent to one of the ordinary skill in the art that modifications to the described embodiment may be made without departing from the spirit of the application. Accordingly, the scope of the application will be defined by the attached claims not by the above detailed descriptions.

What is claimed is:
1. A handheld electronic device, comprising:
a lower body having a carrying surface and a recess on the carrying surface exposed at two opposite sides adjacent to a first side of the carrying surface; an upper body disposed on the carrying surface and having a first end and a second end opposite to the first end;
a sliding mechanism, disposed between the upper body and the lower body, wherein the sliding mechanism comprises a first sliding member and a second sliding member, which are configured to slide relative to each other, and the first sliding member is connected to the upper body; and
a pivot axle, disposed at the first side of the carrying surface and located between the recess and the first side, the pivot axle being connected to the second sliding member and the lower body, wherein when the handheld electronic device is transformed from a retracting state to a spreading state, the first end of the upper body slides from a position immediately on the lower body to a position outside the first side of the carrying surface, and then when the upper body reaches a predetermined position, the upper body rotates along the pivot axle relative to the lower body, and the second end of the upper body enters the recess whereby the carrying surface of the lower body and a top surface of the upper body have an included angle, which is larger or equal to 90 degree and smaller than 180 degree; and
a U-shaped ring disposed at a side of the lower body along the first side of the carrying surface, wherein two arms of the U-shaped ring extends to the two opposite sides to cover the recess and rotates relative to the lower body via the pivot axle together with the upper body.

2. The handheld electronic device as claimed in claim 1, wherein when the handheld electronic device is in the spreading state, the carrying surface of the lower body and the top surface of the upper body together form a step-free continuous surface.

3. The handheld electronic device of claim 2, wherein the first body has a first display screen, the second body has a second display screen, and when the handheld electronic device is in the spreading state, the first display screen and the second display screen perform a seamless display by the step-free continuous surface.

4. The handheld electronic device as claimed in claim 1, wherein the two arms of the U-shaped ring are connected to the pivot axle such that and the U-shaped ring leans against the upper body.

5. The handheld electronic device as claimed in claim 4, wherein the two aims of the U-shaped ring protrude outside a bottom surface of the upper body as the handheld electronic device is in the spreading state.

6. The handheld electronic device as claimed in claim 1, wherein the U-shaped ring is formed integrally with the lower body and surrounding the recess.

7. The handheld electronic device as claimed in claim 1, wherein an end of the lower body corresponding to the recess is shrunk in its thickness to form a step portion exposing the recess, while the upper body has a bump portion corresponding to and having a profile complying with the step portion, such that the bump portion and the step portion closely meet and cover the recess when the handheld electronic device is in the retracting state.

8. The handheld electronic device as claimed in claim 1, wherein the recess has a profile complying with the second end of the upper body.

9. The handheld electronic device as claimed in claim 8, wherein the recess is integrally formed with the lower body.

10. The handheld electronic device as claimed in claim 8, wherein the recess extends to two opposite sides adjacent to the first side of the carrying surface, and two corners of the second end of the upper body are rounded.

11. The handheld electronic device as claimed in claim 1, wherein the sliding mechanism further comprises a first elastic member disposed between the first sliding member and the second sliding member to provide an elastic force driving the first sliding member sliding relative to the second sliding member.

12. The handheld electronic device as claimed in claim 11, wherein the first elastic member is a semi-auto spring.

13. The handheld electronic device as claimed in claim 1, wherein the sliding mechanism further comprises a second elastic member disposed between the second sliding member and the lower body to provide an elastic force driving the upper body rotating relative to the lower body.

14. The handheld electronic device as claimed in claim 13, wherein the second elastic member is a torsion spring or a helical spring.

15. The handheld electronic device as claimed in claim 1, wherein the upper body has a display screen and the lower body has a keyboard.

16. The handheld electronic device as claimed in claim 15, wherein the display screen is a touch screen.

* * * * *